US00RE40874E

(19) United States
(12) Reissued Patent
Wahl et al.

(10) Patent Number: US RE40,874 E
(45) Date of Reissued Patent: *Aug. 18, 2009

(54) GOLF CLUB HEAD HAVING IMPROVED GROOVES

(75) Inventors: Bret H. Wahl, Escondido, CA (US); David Anderson, Hoffman Estates, IL (US)

(73) Assignee: Taylor Made Golf Company, Inc., Carlsbad, CA (US)

( * ) Notice: This patent is subject to a terminal disclaimer.

(21) Appl. No.: 11/776,451

(22) Filed: Jul. 11, 2007

Related U.S. Patent Documents

Reissue of:
(64) Patent No.: 7,156,751
Issued: Jan. 2, 2007
Appl. No.: 10/964,852
Filed: Oct. 13, 2004

U.S. Applications:
(63) Continuation of application No. 10/285,841, filed on Nov. 1, 2002, now Pat. No. 6,814,673.

(51) Int. Cl.
*A63B 53/04* (2006.01)

(52) U.S. Cl. ..... 473/331
(58) Field of Classification Search ..... 473/324–350; D21/750–751, 759
See application file for complete search history.

(56) References Cited

U.S. PATENT DOCUMENTS 4,413,825 A * 11/1983 Sasse ..... 473/331
4,858,929 A * 8/1989 Long ..... 473/290
4,902,016 A * 2/1990 Boone ..... 473/330
5,090,702 A * 2/1992 Viste ..... 473/331
5,100,144 A * 3/1992 Okumoto et al. ..... 473/331
5,358,249 A * 10/1994 Mendralla ..... 473/331
5,437,088 A * 8/1995 Igarashi ..... 29/527.6
5,688,186 A * 11/1997 Michaels et al. ..... 473/290
5,766,087 A * 6/1998 Kawamatsu ..... 473/290
6,299,548 B1 * 10/2001 Lin ..... 473/331
2002/0042306 A1 * 4/2002 Chappell ..... 473/331
2002/0049095 A1 * 4/2002 Galloway et al. ..... 473/330

FOREIGN PATENT DOCUMENTS

EP 0 742 033 A1 * 11/1996

OTHER PUBLICATIONS

1993 Clubmaking Catalog—Dyna–Torque 3 Wedge System Nike Golf, 3 pages.*

* cited by examiner

*Primary Examiner*—Sebastiano Passaniti
(74) *Attorney, Agent, or Firm*—Klarquist Sparkman, LLP

(57) ABSTRACT

A golf club head striking face is provided, including a plurality of grooves, wherein at least one groove has a first and second side. Each side includes a bottom, a lower section, and an upper section. The lower section is substantially planar and disposed between the bottom and the striking face. The upper section is substantially planar and disposed between the lower section and the striking face. A first draft angle is measured between the upper sections of the first and second sides, and a second draft angle is measured between the lower sections and the first and second sides, wherein the first draft angle is greater than the second draft angle. In addition, the distance between the first and second sides continuously increases from the bottom to the striking face.

21 Claims, 3 Drawing Sheets

GOLF CLUB HEAD HAVING IMPROVED GROOVES

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation of Ser. No. 10/285,841, filed Nov. 1, 2002, now U.S. Pat. No. 6,814,673 which is herein incorporated by reference for all purposes.

FIELD OF THE INVENTION

This invention relates generally to golf club heads and, more particularly, to golf clubs heads having specially configured grooves formed in the striking face.

BACKGROUND OF THE INVENTION

Golfers generally know how far a golf ball will be in flight after being struck by a golf club and, consequently, will select a particular club according to how far it is desired for the ball to travel. The launch conditions of the ball generated by the impact (i.e., ball speed, launch angle, and backspin) determine how far the ball will travel. However, a secondary consideration in controlling the ball's travel distance involves what happens after the ball strikes the ground. Once the ball strikes the ground, its movement is primarily affected by the amount of backspin imparted on the ball by the golf club. A ball having a greater amount of backspin after being struck will have less forward roll after it lands on the ground. Less forward roll is advantageous to a golfer because it provides precision landing and placement of the golf ball on a golf green. Lack of sufficient backspin will create too much forward roll, which can cause a golf ball to unmanageably roll either off of the green or in a direction away from a golf hole. Imparting spin on the golf ball is a way to control the golf shot and to provide greater accuracy. This is particularly true if the golf club imparts consistent spin in multiple strikes of the golf ball.

To gain backspin, grooves, or score lines, are placed in and extended across the face of a golf club. The grooves help to grip the ball when it is hit by the club. Because the golf club has a lofted angle, the ball is driven forward and upward, generating backspin. The greater the loft, the greater the backspin, and the more the grooves grip the ball, the even greater the amount of backspin. Since a high amount of backspin is most desirable when using high lofted clubs, the focus of groove geometry has centered primarily on irons, and, in particular, primarily on 7 irons through wedges. Wedges are generally designed with a variety of loft angles, ranging from about 48 degrees to 64 degrees, to vary the control of distance and trajectory.

A variety of groove configurations have been devised to achieve additional backspin. These configurations include squared grooves, V-shaped grooves, U-shaped grooves, and variations of these shapes, including grooves with parabolic sides as discussed in U.S. Pat. No. 4,858,929 Long. These shapes are governed by the U.S. Golf Association ("USGA") rules of golf as to their depth, width, spacing, and positioning. Specifically, a groove may not be deeper than 0.508 mm or wider than 0.9 mm. Adjacent grooves may not be closer than three times the width of the groove (the "3-times-width rule") and must be at least 1.905 mm apart. Finally, the width and cross-section of the grooves must be consistent across the face of the club head and along the length of the grooves.

The multiple shapes of the grooves illustrate how challenging it is to fulfill the requirements of effective grooves while staying true to the USGA rules. In general, more grip is achieved by increasing the surface contact between a ball and the groove and reducing the amount of debris (e.g., water, sand, and organic matter) between the ball and the club face. Therefore, a larger number of grooves provide better gripping, but the width must be reduced to accommodate the 3-times-width rule. Conversely, wider grooves perform better because more ball surface may enter the groove, but the 3-times-width rule allows ball contact with very few grooves. The draft angle or draft of a groove is commonly defined as the angle between an axis perpendicular to the face of the club head and a sidewall of the groove. Deeper grooves, e.g., U-or box-shaped grooves, allow for more release of debris trapped between the club face and the ball, but deep grooves have shallow drafts and allow little contact between the groove and the ball. Highly drafted grooves, e.g., V-shaped grooves, allow for more surface contact between the ball and the groove surface, but an evacuation area for debris is limited. The problem of V-shaped grooves is compounded because the USGA rules define groove width in terms of the intersection between the edges of the groove and a line of each side of the groove that is angled 30-degrees to the club face. The groove width is the distance between the two intersection points on each side of the groove. This severely limits the depth of a V-shaped groove. Also, V-shaped grooves typically have sharp top edges that may scuff the ball.

It should, therefore, be appreciated there is a need for a golf club head that imparts increased backspin to the ball in a range of playing situations and conditions. The present invention fulfills this need and others.

SUMMARY OF THE INVENTION

The present invention provides a golf club head having grooves that impart increased backspin to a golf ball in a range of playing situations and conditions. The grooves include a first side, a second side, a pair of top junctures where the first and second sides join a planar face of the club head, a bottom and a pair of bottom junctures where the first and second sides join the bottom. The spacing between the first and second sides continually increases from the bottom to the top junctures. Each of the sides has a lower section positioned nearer the bottom and an upper section positioned nearer the face, and each of the lower and upper sections is substantially planar. Since the spacing of between the sides increases from the bottom to the top junctures, the lower sections form a first draft and the upper sections form a second draft, resulting in a dual-draft groove configuration. The top junctures are convexly rounded, and the bottom junctures are concavely rounded.

In a detailed aspect of a preferred embodiment of the present invention, the lower sections are offset relative to one another at an angle between about 5 degrees and about 40 degrees, and the upper sections are offset relative to one another at an angle between about 80 degrees and about 100 degrees.

In another detailed aspect of a preferred embodiment, each of the top junctures is defined by a circular arc having a first radius and is tangent to the planar face and tangent to the adjacent upper section.

In yet another detailed aspect of a preferred embodiment, each of the bottom junctures is defined by a circular arc having a second radius and is tangent to the bottom and tangent to the adjacent lower section.

In yet another detailed aspect of a preferred embodiment, each of the middle junctures is defined by a circular arc having a third radius and is tangent to the adjacent upper and lower sections.

For purposes of summarizing the invention and the advantages achieved over the prior art, certain advantages of the invention have been described herein above. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the herein disclosed invention. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENT

Figure 1:
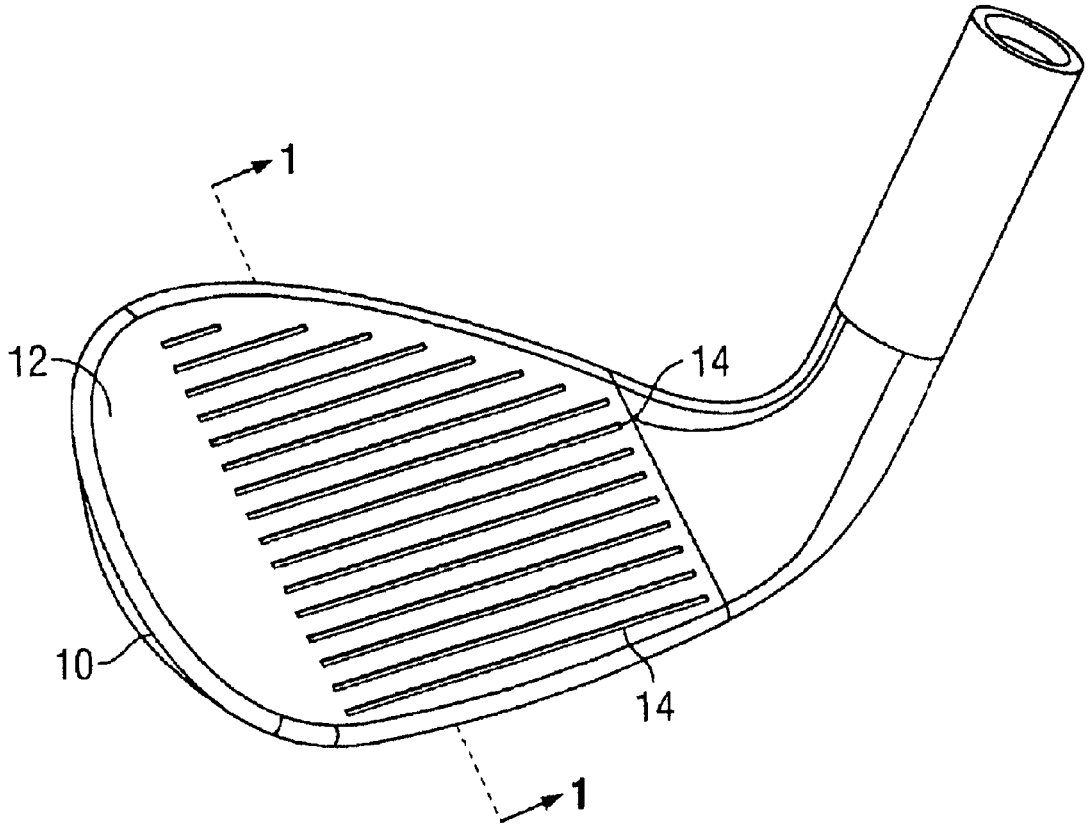
FIG. 1 is a perspective view of a wedge having grooves formed in its face according to a preferred embodiment of the present invention.

With reference to the illustrative drawings, and particularly FIG. 1, there is shown a golf club head 10 having a striking face 12 and a plurality of grooves 14. The grooves 14 are provided with a cross section that is consistent among the grooves 14 and throughout the lengths thereof. More particularly, the grooves 14 are drafted with both a relatively shallow upper portion to provide increased surface area for contact with a ball (not shown) and a highly-drafted lower portion to provide a relatively substantial evacuation area for debris that would otherwise interfere with ball contact. Consequently, the club head 10 imparts increased backspin to the ball in a range of playing situations and conditions without the need of sharp edges that would scuff the ball.

Figure 2:
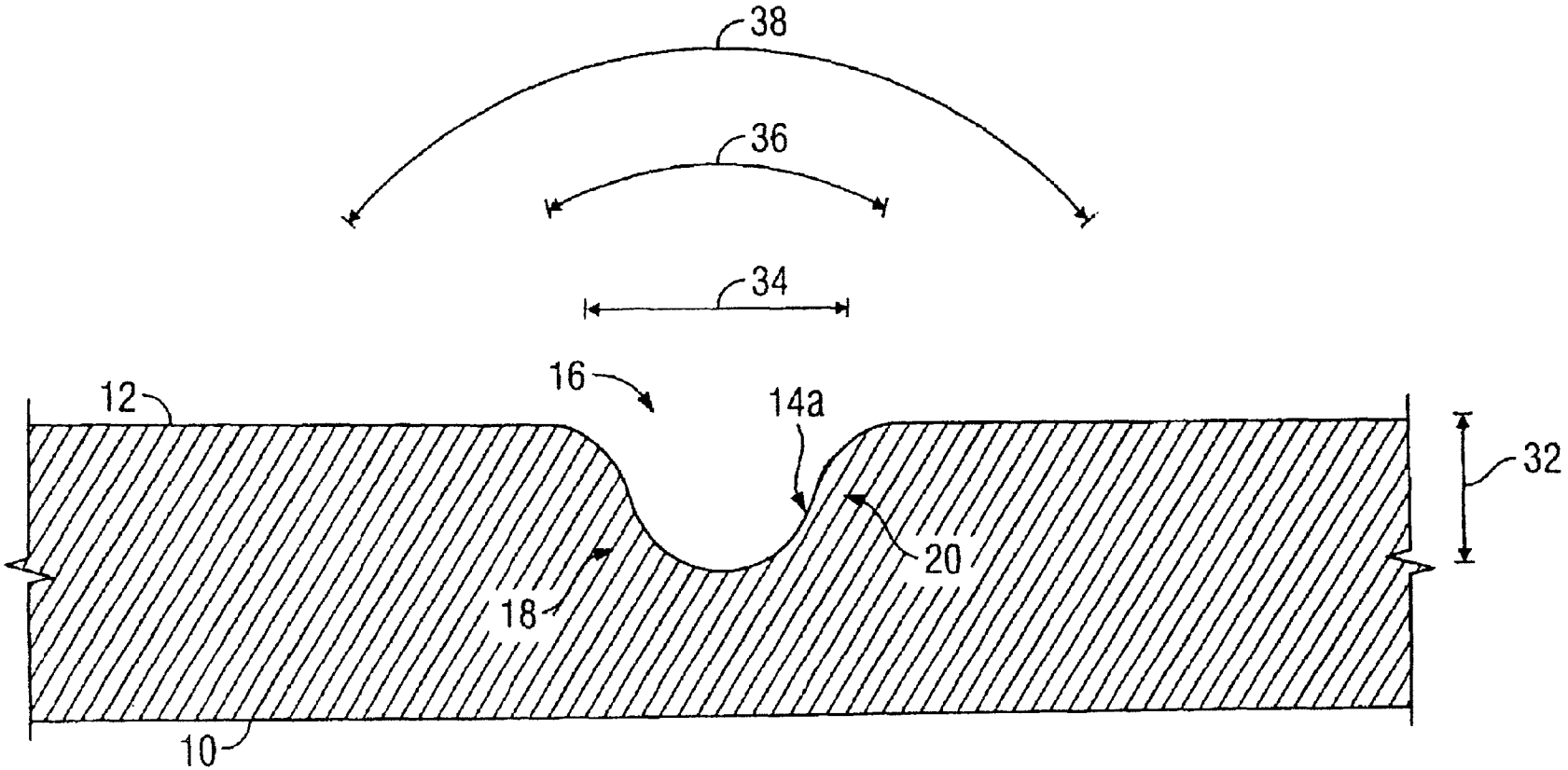
FIG. 2 is an enlarged, fragmentary cross-sectional view of one groove of the wedge of FIG. 1, taken along line 1—1 of FIG. 1.
Figure 3:
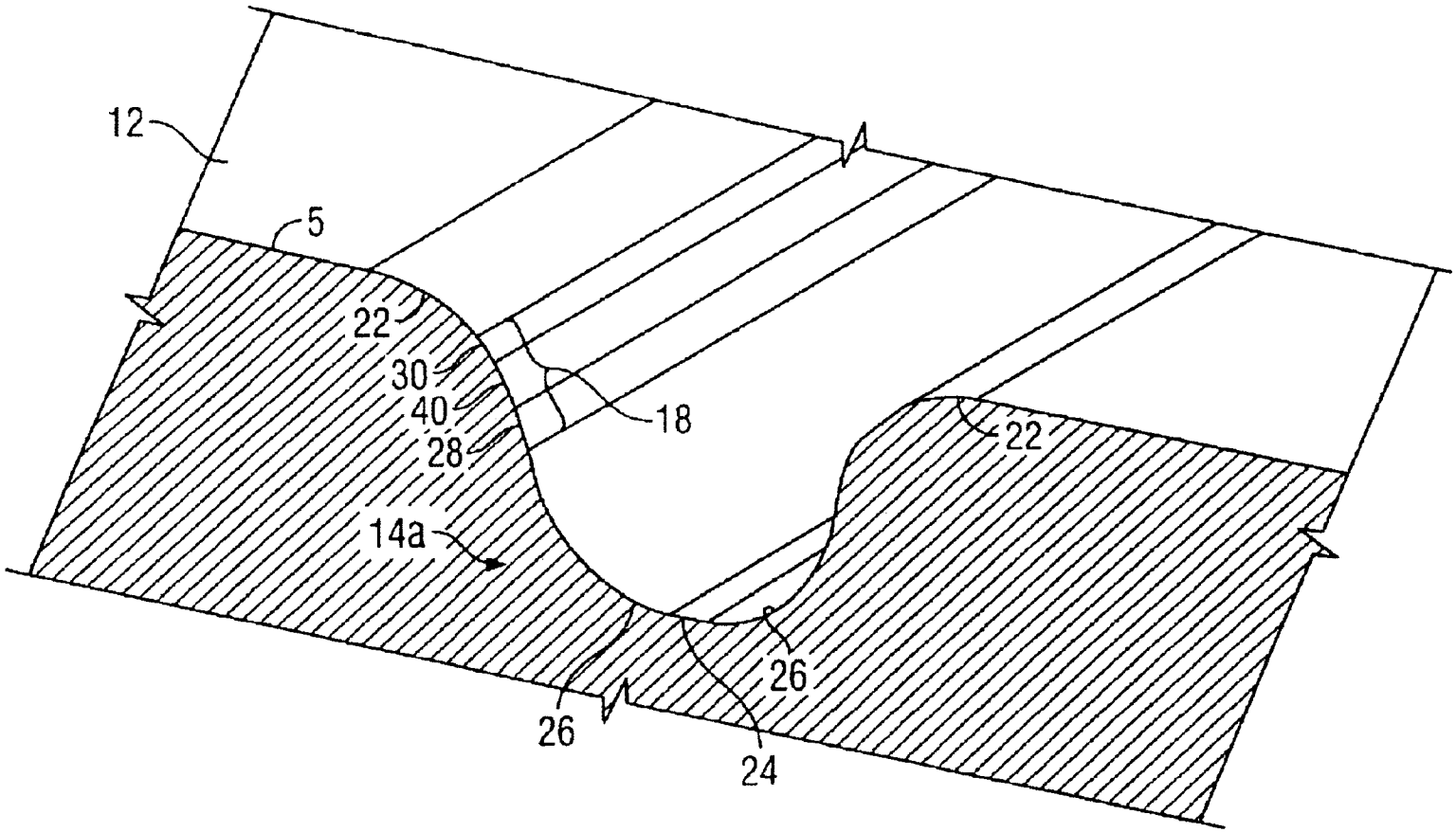
FIG. 3 is an enlarged perspective view of the groove depicted in FIG. 2.

With reference now to FIGS. 2 and 3, each groove, as depicted by a representative groove 14a, defines an opening 16 and includes first and second sides 18, 20 and a pair of curved top-junctures 22 that join the sides 18, 20 to the striking face 12. Each groove 14a further includes a bottom 24 and a pair of curved bottom junctures 26 that join the bottom to the sides 18, 20. Each groove 14a is generally symmetrical about a bisecting plane (S) that intersects the bottom 24 and a plane (F) defined by the striking face 12. First and second sides 18, 20 may each include upper sections 30, lower sections 28, and curved middle-juncture 40. The upper sections 30 and the lower sections 28 of each side 18, 20 are substantially planar and oriented at different angles and are joined by curved middle-juncture 40.

As best seen in FIG. 2, the lower sections 28 are symmetrically offset by a first angle 36 relative to one another. The first angle 36 is preferably between 5 degrees and 40 degrees, more preferably between 20 degrees and 40 degrees, and most preferably between 23 degrees and 33 degrees. The upper sections 30 also are symmetrically offset by a second angle 38 relative to one another. The second angle 38 is preferably between 80 degrees and 100 degrees and more preferably between 85 degrees and 95 degrees.

The grooves 14 have a depth 32 generally between 0.33 mm and 0.50 mm, as measured from plane (F) to the bottom 24. Preferably, the width 34 (as measured in accordance with USGA rules as described above) is between 0.70 mm and 0.86 mm. The grooves 14 are preferably spaced between 3.25 mm and 3.45 mm apart, as measured between planes bisecting a pair of adjacently positioned grooves 14. The groves 14 are more preferably spaced 3.30 mm and 3.40 mm apart and most preferably spaced 3.352 mm apart.

Surface topography and lengths of each portion of the groove 14a, as measured along the groove's cross section from the top junctures 22 to the bottom 24, are discussed. The top junctures 22 are convexly rounded, each having a radius of curvature preferably between 0.10 mm and 0.30 mm and more preferably between 0.20 mm and 0.30 mm. Although in this embodiment the top junctures 22 have a constant radius of curvature, in other embodiments the radius of curvature can vary along the cross-sectional length of the top junctures 22. Each of the top junctures 22 has a cross-sectional length preferably between 0.18 mm and 0.21 mm, more preferably between 0.19 mm and 0.20 mm and most preferably equal to 0.196 mm.

Each of the upper sections 30 has a cross-sectional length preferably between 0.03 mm and 0.07 mm, more preferably between 0.04 mm and 0.06 mm and most preferably at least 0.05 mm. Each of upper sections 30 may be substantially planar.

Each middle juncture 40 is convexly rounded having a radius of curvature generally between 0.06 mm and 0.25 mm and preferably between 0.06 mm and 0.20 mm. Each of the middle junctures 40 preferably has a cross-sectional length between 0.05 mm and 0.09 mm, more preferably 0.06 mm and 0.08 mm and most preferably equal to 0.07 mm.

The lower sections 28 each preferably have a cross-sectional length between 0.05 mm and 0.09 mm, more preferably between 0.06 mm and 0.08 mm and most preferably at least 0.07 mm. Each of lower sections 28 may be substantially planar.

The bottom junctures 26 are concavely rounded having a radius of curvature between 0.1 mm and 0.50 mm, more preferably between 0.25 mm and 0.50 mm, and even more preferably between 0.40 mm and 0.50 mm. The bottom junctures 26 each have a cross-sectional length between 0.31 mm and 0.35 mm, more preferably between 0.32 mm and 0.34 mm and most preferably equal to 0.33 mm. Although in this embodiment the bottom junctures 26 have a constant radius of curvature, in other embodiments the radius of curvature can vary along the cross-sectional length of the bottom junctures 26.

The bottom 24 preferably has a cross-sectional length between 0.04 mm and 0.08 mm, more preferably between 0.05 mm and 0.07 mm and most preferably at least equal to 0.06 mm. The bottom 24 and bottom junctures 26 form a trough that acts as a channel for receiving materials such as sand, water and organic matter so that those materials do not interfere with the contact between the upper portions of the grooves 14 and a golf ball cover. Also, in other preferred embodiments, the grooves 14 have a curved trough free of a planar bottom section.

Table 1 below depicts results from a test comparing a 56-degree wedge having dual-draft grooves in accordance with the present invention to other 56-degree wedges having conventional grooves. Multiple samples of each were used to strike a ball to determine the variation, as 3 standard deviations (3σ) between wedges of the same make.

TABLE 1

Comparison of Launch Conditions Between Wedge Designs

| | Wedge with Dual-Drafted Grooves | | Wedges with Alternative Grooves | | Percent Difference | |
|---|---|---|---|---|---|---|
| 56-degree Wedge | Average | Variation | Average | Variation | Average | Variation |
| Ball speed (km/hr) | 138 | 6 | 132 | 14 | 5% | −55% |
| Launch Angle (deg) | 28 | 4 | 33 | 6 | −15% | −33% |
| Backspin (rpm) | 10,000 | 1500 | 7500 | 3000 | 33% | −50% |

Testing revealed that the wedge incorporating dual-draft grooves in accordance with the present invention produced superior results. As can be seen by Table 1, the club heads of the present invention demonstrate both greater consistency and a higher average backspin rpm.

The golf club head 10 can be manufactured utilizing computer numerical controlled ("CNC") milling. The face 12 of the golf head 10 is first milled to achieve a substantially flat surface. Next, the grooves 14 are milled into the face 12 to a tolerance of less than 0.05 mm. This forms grooves 14 which are consistent along their length and between other grooves 14 on the face. The high-repeatability of CNC milling ensures that two faces milled in this manner will not have the wide variances found in other methods of manufacture.

It should be appreciated from the foregoing description that the present invention provides a golf club head 10 with improved grooves 14 affording increased surface area for contact with a ball while providing a relatively substantial evacuation area for debris that would otherwise interfere with ball contact, thereby resulting in increased backspin and improved consistency in a range of playing situations and conditions.

The foregoing detailed description of the present invention is provided for the purposes of illustration and is not intended to be exhaustive or to limit the invention to the precise embodiments disclosed. Accordingly, the scope of the present invention is defined only by the claims set forth below.

We claim:

1. A golf club head striking face having a plurality of grooves formed therein, at least one groove having first and second sides, each side comprising:

a bottom;

a lower section disposed between the bottom and the striking face, wherein the lower section is substantially planar; and an upper section disposed between the lower section and the striking face, wherein the upper section is substantially planar;

wherein a first draft angle measured between the upper sections of the first and second sides is greater than a second draft angle measured between the lower sections of the first and second sides, and wherein a distance measured between the first and second sides continuously increases from the bottom to the striking face.

2. The golf club head striking face of claim 1, further comprising a middle juncture disposed between the upper section and the lower section, wherein the middle juncture is curved.

3. The golf club head striking face of claim 2, wherein the middle juncture is [concave] *convex*.

4. The golf club head striking face of claim 2, wherein the middle juncture is defined by a radius of curvature between about 0.06 mm and about 0.25 mm.

5. The golf club head striking face of claim 1, further comprising a bottom juncture disposed between the lower section and the bottom, wherein the bottom juncture is curved.

6. The golf club head striking face of claim 5, wherein the bottom juncture is concave.

7. The golf club head striking face of claim 5, wherein the bottom juncture is defined by a radius of curvature between about 0.10 mm and about 0.50 mm.

8. The golf club head striking face of claim 1, further comprising a top juncture disposed between the upper section and the striking face, wherein the top juncture is curved.

9. The golf club head striking face of claim 8, wherein the top juncture is convex.

10. The golf club head striking face of claim 8, wherein the top juncture is defined by a radius of curvature between about 0.10 mm and about 0.30 mm.

11. The golf club head striking face of claim 1, wherein the first draft angle is between about 80 degrees and about 100 degrees, and wherein the second draft angle is between about 5 degrees and about 40 degrees.

12. The golf club head striking face of claim 1, wherein a distance measured between the striking face and the bottom is between about 0.33 mm and about 0.5 mm.

13. The golf club head striking face of claim 1, wherein the upper section has a length between about 0.03 mm and about 0.07 mm.

14. The golf club head striking face of claim 1, wherein the lower section has a length between about 0.05 mm and about 0.09 mm.

15. The golf club head striking face of claim 1, wherein the groove has a USGA groove width measured along a line extending between a pair of tangents, points of a pair of oppositely spaced lines each being at a 30-degree tangent to a top juncture of the groove, and wherein the USGA groove width is between about 0.70 mm and about 0.86 mm.

16. The golf club head striking face of claim 1, wherein the bottom is substantially planar.

17. The golf club head striking face of claim 1, wherein the bottom is curved.

18. The golf club head striking face of claim 1, wherein the groove is substantially symmetric about a plane that bisects the bottom.

19. The golf club head striking face having a plurality of grooves formed therein, at least one groove having first and second sides, each side comprising:

a bottom, wherein the bottom is substantially curved;

a substantially planar lower section disposed between the bottom and the striking face; and a substantially planar upper section disposed between the lower section and the striking face, wherein the lower section and the upper section are not co-planar.

20. A golf club head striking face having a plurality of grooves formed therein, at least one groove comprising:

a bottom portion;

a substantially planar lower section coupled to the bottom portion;

a middle junction disposed between the lower section and the striking face, wherein the middle juncture is [concavely] *convexly* rounded; and a substantially planar upper section disposed between the middle juncture and the striking face, wherein the lower section and the upper section are not co-planar.

21. A golf club head striking face having a plurality of grooves formed therein, at least one groove having first and second sides, each side comprising:

a bottom;

a middle juncture disposed between the bottom and the striking face, wherein the middle juncture is [concavely] *convexly* rounded;

a lower section disposed between the middle juncture and the bottom, wherein the lower section is substantially planar;

a bottom juncture disposed between the lower section and the bottom, wherein the bottom juncture is concavely rounded;

an upper section disposed between the middle juncture and the striking face, wherein the upper section is substantially planar; and a top junction disposed between the upper section and the striking face, wherein the top juncture is convexly rounded;

wherein a first draft angle measured between the upper sections of the first and second sides is greater than a second draft angle measured between the lower sections of the first and second sides, and wherein a distance measured between the first and second sides continuously increases from the bottom junctures to the top junctures.

* * * * *